(12) United States Patent
Hirata et al.

(10) Patent No.: US 12,139,609 B2
(45) Date of Patent: *Nov. 12, 2024

(54) RESIN COMPOSITION COMPRISING THERMOPLASTIC PLASTOMER AND HOLLOW RESIN PARTICLES AND MOLDED PRODUCT THEREOF

(71) Applicant: ZEON CORPORATION, Tokyo (JP)

(72) Inventors: Takeshi Hirata, Tokyo (JP); Takashi Iga, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 712 days.

This patent is subject to a terminal disclaimer.

(21) Appl. No.: 17/279,711

(22) PCT Filed: Sep. 13, 2019

(86) PCT No.: PCT/JP2019/036155
§ 371 (c)(1),
(2) Date: Mar. 25, 2021

(87) PCT Pub. No.: WO2020/066704
PCT Pub. Date: Apr. 2, 2020

(65) Prior Publication Data
US 2022/0033652 A1 Feb. 3, 2022

(30) Foreign Application Priority Data
Sep. 28, 2018 (JP) .................. 2018-184285

(51) Int. Cl.
| | | |
|---|---|---|
| C08L 77/02 | (2006.01) | |
| C08F 120/44 | (2006.01) | |
| C08F 222/10 | (2006.01) | |
| C08F 232/06 | (2006.01) | |
| C08L 23/12 | (2006.01) | |
| C08L 25/02 | (2006.01) | |
| C08L 33/06 | (2006.01) | |

(52) U.S. Cl.
CPC ............ C08L 77/02 (2013.01); C08F 120/44 (2013.01); C08F 222/102 (2020.02); C08F 232/06 (2013.01); C08L 23/12 (2013.01); C08L 2205/20 (2013.01); C08L 2312/00 (2013.01)

(58) Field of Classification Search
None
See application file for complete search history.

(56) References Cited

U.S. PATENT DOCUMENTS

| | | |
|---|---|---|
| 2010/0144924 A1 | 6/2010 | Yoshiwara et al. |
| 2019/0194415 A1 | 6/2019 | Tayagaki et al. |
| 2022/0033628 A1* | 2/2022 | Hirata .................. C08F 222/102 |

FOREIGN PATENT DOCUMENTS

| | | | |
|---|---|---|---|
| JP | H04-108570 A | | 4/1992 |
| JP | 2006-291090 A | | 10/2006 |
| JP | 2008064951 | * | 3/2008 |
| JP | 2009242477 | * | 10/2009 |
| JP | 2010-123348 A | | 6/2010 |
| JP | 2011-102378 A | | 5/2011 |
| JP | 6182004 B2 | | 8/2017 |
| JP | 6196592 B2 | | 9/2017 |
| JP | 6283456 B1 | | 2/2018 |
| WO | 2016/104306 A1 | | 6/2016 |
| WO | 2018/012415 A1 | | 1/2018 |

OTHER PUBLICATIONS

Horiba Scientific; A Guidebook to Particle Size Analysis (2010) pp. 1-29. (Year: 2010).*
Gam; Dynamics in Polymer Nanocomposites, University of Pennsylvania Dissertation (2011) pp. 83-110 (Year: 2011).*
Horiba Scientific; A Guidebook to Particle Size Analysis (2010) pp. 1-29 (Year: 2201).*
Malvern "Basic Principles of Particle Size Analysis" (2014) pp. 1-19. (Year: 2014).*
Notification of Transmittal of Translation of the International Preliminary Report on Patentability (Form PCT/IB/338) issued in counterpart International Application No. PCT/JP2019/036155 mailed Apr. 8, 2021 with Forms PCT/IB/373 and PCT/ISA/237. (7 pages).
Extended (Supplementary) European Search Report dated May 17, 2022, issued in counterpart EP Application No. 19867632.2. (5 pages).
Notification of Transmittal of Translation of the International Preliminary Report on Patentability (Form PCT/IB/338) issued in counterpart International Application No. PCT/JP2019/036156 mailed Apr. 8, 2021 with Forms PCT/IB/373 and PCT/ISA/237. (5 pages).
Extended (Supplementary)European Search Report dated May 17, 2022, issued in counterpart EP Application No. 19864566.5. (5 pages).
Non-Final Office Action dated Dec. 14, 2023, issued in U.S. Appl. No. 17/279,720 (14 pages).

(Continued)

*Primary Examiner* — David J Buttner
(74) *Attorney, Agent, or Firm* — WHDA, LLP (57) ABSTRACT

Provided is a resin composition configured to show a small change in the void ratio of hollow resin particles during mold processing and configured to stably mold a lightweight molded product. The resin composition is a resin composition comprising 50 parts by mass to 95 parts by mass of a thermoplastic plastomer and 5 parts by mass to 50 parts by mass of hollow resin particles, wherein the hollow resin particles have a void ratio of from 50% to 85%; wherein the hollow resin particles have a shell containing a resin; and wherein, with respect to 100 parts by mass of repeating units constituting the resin, 30 parts by mass to 100 parts by mass of a crosslinkable monomer unit and 0 part by mass to 70 parts by mass of a non-crosslinkable monomer unit are contained as a polymerizable monomer unit.

8 Claims, 2 Drawing Sheets

(56) References Cited

OTHER PUBLICATIONS

Final Office Action dated Mar. 26, 2024, issued in U.S. Appl. No. 17/279,720 (7 pages).
Notice of Allowance dated Jul. 18, 2024, issued in U.S. Appl. No. 17/279,720. (14 pages).

* cited by examiner

RESIN COMPOSITION COMPRISING THERMOPLASTIC PLASTOMER AND HOLLOW RESIN PARTICLES AND MOLDED PRODUCT THEREOF

TECHNICAL FIELD

The disclosure relates to a resin composition and a molded product thereof.

BACKGROUND ART

In the process of automobile assembly, thermoplastic or thermosetting molding resins as typified by polyvinyl chloride (PVC), urethane, epoxy, etc., have been used.

The recent trend of growing awareness to environmental problems such as global warming and air pollution, has increased the demand for reducing the weight of automobiles to improve their fuel efficiency. Thus, automobile manufacturers have been trying to reduce the weight of automotive parts, as well as the weight of molding resins.

Patent Literature 1 describes that in a resin composition containing hollow particles and an organic base resin, since the volume proportion of air in the hollow particles is 30% or more when the total volume of the hollow particles is determined as 100%, the durability of the hollow particles against an external pressure load increases and suppresses the collapse of the hollow particles in the step of mixing and filling the hollow particles.

Patent Literature 2 describes that hollow resin particles having excellent pressure resistance in their production and use, are obtained by hollow resin particles which comprise a thermoplastic resin shell and a hollow part surrounded by the shell, in which a blowing agent is encapsulated, and in which an organic compound having a vapor pressure higher than 100 kPa at 25° C. is contained in a specific proportion as the blowing agent.

Patent Literature 3 discloses hollow particles such that the outer shell portion is made of a thermoplastic resin, and an included agent is included.

Patent Literature 4 discloses an automotive sealing material prepared by adding glass-based or shirasu-based spherical particles to a resin.

CITATION LIST

Patent Literatures

Patent Literature 1: International Publication No. WO2018/012415
Patent Literature 2: U.S. Pat. No. 6,283,456
Patent Literature 3: U.S. Pat. No. 6,196,592
Patent Literature 4: Japanese Patent Application Laid-Open No. H04-108570

SUMMARY OF INVENTION

Technical Problem

For the hollow particles disclosed in Patent Literature 1, the shell part is made of a thermoplastic resin, and the volume proportion of the shell part is less than 70%. Accordingly, the shell part collapses when a load is applied thereto in a high temperature condition, and the weight reduction of a molded product molded by use of the resin composition containing the hollow particles, cannot be sufficiently achieved.

The hollow resin particles disclosed in Patent Literature 2, in which the blowing agent is encapsulated, and the hollow particles disclosed in Patent Literature 3, in which the included agent is included, have the following problem: they expand in a high temperature condition, and for the purpose of obtaining molded products with desired physical properties, limitations are imposed on the conditions (e.g., temperature and time) of the production of the molded products.

The glass disclosed in Patent Literature 4 is a material of high specific gravity. Accordingly, there is a problem of insufficient reduction of the weight of parts.

In light of the above circumstances, an object of the present disclosure is to provide a resin composition configured to show a small change in the void ratio of hollow resin particles during mold processing and configured to stably mold a lightweight molded product.

Solution to Problem

The present disclosure provides a resin composition comprising 50 parts by mass to 95 parts by mass of a thermoplastic plastomer and 5 parts by mass to 50 parts by mass of hollow resin particles,
  wherein the hollow resin particles have a void ratio of from 50% to 85%;
  wherein the hollow resin particles have a shell containing a resin; and
  wherein, with respect to 100 parts by mass of repeating units constituting the resin, 30 parts by mass to 100 parts by mass of a crosslinkable monomer unit and 0 part by mass to 70 parts by mass of a non-crosslinkable monomer unit are contained as a polymerizable monomer unit.

According to the resin composition of the present disclosure, the hollow resin particles preferably do not exhibit a glass transition temperature in a range of from 0° C. to 250° C.

According to the resin composition of the present disclosure, the hollow resin particles preferably have a volume-based average particle diameter of from 1.0 μm to 20.0 μm.

The present disclosure provides a molded product comprising the resin composition described above.

Advantageous Effects of Invention

According to the present disclosure, the resin composition configured to show a small change in the void ratio of the hollow resin particles during mold processing and configured to stably mold a lightweight molded product, can be provided.

BRIEF DESCRIPTION OF DRAWINGS

In the accompanying drawings.

DESCRIPTION OF EMBODIMENTS

The present disclosure provides a resin composition comprising 50 parts by mass to 95 parts by mass of a thermoplastic plastomer and 5 parts by mass to 50 parts by mass of hollow resin particles, wherein the hollow resin particles have a void ratio of from 50% to 85%;

wherein the hollow resin particles have a shell containing a resin; and wherein, with respect to 100 parts by mass of repeating units constituting the resin, 30 parts by mass to 100 parts by mass of a crosslinkable monomer unit and 0 part by mass to 70 parts by mass of a non-crosslinkable monomer unit are contained as a polymerizable monomer unit.

The shell of the hollow resin particles contained in the resin composition of the present disclosure, is the resin in which the proportion of the crosslinkable monomer is high. Accordingly, the shell has low thermoplasticity, and the mechanical strength of the hollow resin particles is high even at high temperature. Also, since the hollow resin particles do not include an included agent, they are not likely to expand even when they are heated. Accordingly, the hollow resin particles are not likely to cause a collapse by external force, cause expansion by an increase in internal pressure, etc., at high temperature. As a result, the hollow resin particles are not likely to collapse in a high-temperature and high-pressure environment during the mold processing of the resin composition, and the hollow resin particles show a small change in the void ratio. Also, the hollow resin particles are lightweight particles due to their high void ratio.

According to the resin composition of the present disclosure, a lightweight molded product can be stably molded since a molded product with a certain void ratio can be obtained irrespective of mold processing conditions such as extrusion molding and injection molding.

Due to the above reasons, the resin composition of the present disclosure offers a wide range of selectable mold processing conditions.

The resin composition of the present disclosure comprises 50 parts by mass to 95 parts by mass of a thermoplastic plastomer and 5 parts by mass to 50 parts by mass of hollow resin particles. The upper limit of the thermoplastic plastomer is preferably 90 parts by mass or less, and the lower limit of the hollow resin particles is preferably 10 parts by mass or more.

In general, a plastomer means a material characterized in that it exhibits no or almost no elastic deformation and easily causes plastic deformation. In contrast, an elastomer means a material characterized in that when external force is applied thereto, it instantly deforms depending on the external force, and when it is released from the external force, it goes back to the original shape in a short time.

In the present disclosure, the "thermoplastic plastomer" means a polymer characterized in that it can be easily fluidized and deformed by heating and it can be fixed in the deformed shape by cooling.

In the present disclosure, typically, such a material can be used as the thermoplastic plastomer, that when the original size is determined as 100% in a tensile test, it can be extended up to 200% at room temperature (20° C.) by a small external force, and even after it is released from the external force, the size does not return to less than 130%. In particular, the small external force means an external force having a tensile strength of from 1 MPa to 100 MPa. More specifically, the following polymer can be used as the thermoplastic plastomer: based on the permanent set testing of JIS K 6262-1997, in a tensile test at 20° C., a specimen in the dumbbell No. 4 shape defined in JIS K 6251-1993 can be extended twice the gauge length before extension, and in the case where the specimen is extended twice the gauge length before extension and retained in that state for 60 minutes, it exhibits a permanent set of 30% or more 5 minutes after it is released from the tensile external force.

As the thermoplastic plastomer, thermoplastic resins applicable to conventionally-known mold processing, can be widely used. As the thermoplastic resin, examples include, but are not limited to, polyvinyl chloride; polyvinylidene chloride; polyvinyl alcohol; ethylene copolymer such as ethylene-vinyl alcohol copolymer, ethylene-vinyl acetate copolymer, ethylene-methyl (meth)acrylate copolymer, ethylene-ethyl (meth)acrylate copolymer and ethylene-butyl (meth)acrylate copolymer; polyolefin resin such as low density polyethylene, high density polyethylene, polypropylene, polybutene, polyisobutylene, polystyrene, polyterpene and polycycloolefin; styrene copolymer such as styrene-acryronitrile copolymer and styrene-butadiene-acryronitrile copolymer; polyacetal; polymethyl methacrylate; cellulose acetate; polycarbonate; polyester resin such as polyethylene terephthalate and polybutylene terephthalate; polyamide resin such as polyamide 6 and polyamide 66; thermoplastic polyurethane; polytetrafluoroethylene resin (PTFE); ionomer resin such as ethylene ionomer, urethane ionomer, styrene ionomer and fluorine ionomer; polyacetal; and polyphenylene sulfide.

[Hollow Resin Particle]

In the present disclosure, the "hollow resin particle" means a resin particle which has a shell containing a resin (an outer shell portion) and which generally has one or two or more hollow portions filled with vacuum or gas.

In the present disclosure, the "hollow portion" means a portion of the interior of a particle occupied by a hollow. Whether a particle has a hollow portion or not can be determined by, for example, SEM observation of a cross section of the relevant particle or TEM observation of the relevant particle as it is.

The resin shell (the outer shell portion) of the particle may not have a communication hole, and the "hollow portion" in the present disclosure may be isolated from the outside of the particle by the shell of the particle.

The resin shell of the particle may have one or two or more communication holes, and the "hollow portion" in the present disclosure may communicate with the outside of the particle via the communication hole.

In the present disclosure, the "hollow" means a space which is surrounded by the shell and which can be filled with a highly fluid medium such as liquid and gas. That is, it means a so-called void state.

The void ratio of the hollow resin particle can be reworded as the volume ratio occupied by the hollow portion of the hollow resin particle.

For the void ratio of the hollow resin particle, the lower limit is 50% or more, preferably 53% or more, more preferably 55% or more, still more preferably 58% or more, and particularly preferably 62% or more. When the void ratio of the hollow resin particle is 50% or more, since the ratio occupied by the hollow portion is high, the hollow resin particles can achieve weight reduction. For the void ratio of the hollow resin particle, the upper limit is 85% or less. From the viewpoint of maintaining the strength of the hollow resin particle, the upper limit is preferably 84% or less, more preferably 83% or less, still more preferably 81% or less, and particularly preferably 78% or less.

The void ratio of the hollow resin particle is calculated as follows, on the basis of the following formula (0). The apparent density $D_1$ was divided by the true density $D_0$. The resultant was multiplied by 100, and the value thus obtained was subtracted from 100, thereby obtaining the void ratio of the particle.

Void ratio (%)=100−[Apparent density $D_1$]/[True density $D_0$]×100   Formula (0)

A method of measuring the apparent density $D_1$ of the hollow resin particle is as follows. First, approximately 30 cm³ of hollow resin particles are introduced into a measuring flask with a volume of 100 cm³, and the mass of the introduced hollow resin particles is precisely weighed. Next, the measuring flask in which the hollow resin particles are introduced is precisely filled with isopropanol up to the marked line while care is taken so that air bubbles do not get in. The mass of the isopropanol added to the measuring flask is precisely weighed, and the apparent density $D_1$ (g/cm³) of the hollow resin particle is calculated on the basis of Formula (I) mentioned below.

Apparent density $D_1$=[Mass of the hollow resin particles]/(100−

[Mass of the isopropanol]/[Specific gravity of the isopropanol at the measuring temperature])   Formula (I)

The apparent density $D_1$ is equivalent to the specific gravity of the whole hollow resin particle in the case where the hollow portion is regarded as part of the hollow resin particle.

A method of measuring the true density $D_0$ of the hollow resin particle is as follows. Hollow resin particles are pulverized in advance; then, approximately 10 g of pulverized pieces of hollow resin particles are introduced into a measuring flask with a volume of 100 cm³, and the mass of the introduced pulverized pieces is precisely weighed. After that, similarly to the measurement of the apparent density mentioned above, isopropanol is added to the measuring flask, the mass of the isopropanol is precisely weighed, and the true density $D_0$ (g/cm³) of the hollow resin particle is calculated on the basis of Formula (II) mentioned below.

True density $D_0$=[Mass of the pulverized pieces of the hollow resin particles]/(100−[Mass of the isopropanol]/[Specific gravity of the isopropanol at the measuring temperature])   Formula (II)

The true density $D_0$ is equivalent to the specific gravity of the shell portion alone of the hollow resin particle. As is clear from the measurement method mentioned above, when calculating the true density $D_0$, the hollow portion is not regarded as a part of the hollow resin particle.

The hollow resin particles preferably do not exhibit a glass transition temperature (Tg) in a range of from 0° C. to 250° C. Since the hollow resin particles do not exhibit a glass transition temperature (Tg) in a range of from 0° C. to 250° C., it is considered that the hollow resin particles are not likely to deform and collapse when heated.

The glass transition temperature can be measured by differential scanning calorimetry (DSC).

For the volume-based average particle diameter (volume average particle diameter) of the hollow resin particles, the lower limit is preferably 1.0 μm or more, more preferably 1.3 μm or more, still more preferably 1.6 μm or more, particularly preferably 2.0 μm or more, and most preferably 2.3 μm or more. The upper limit is preferably 20.0 μm or less, more preferably 16.0 μm or less, still more preferably 12.0 μm or less, particularly preferably 9.0 μm or less, and most preferably 6.5 μm or less.

When the volume average particle diameter of the hollow resin particle is 1.0 μm or more, the desired void ratio is obtained. Accordingly, the hollow resin particles can achieve weight reduction. Further, when the volume average particle diameter of the hollow resin particles is 20.0 μm or less, since the hollow resin particles are not likely to collapse, the hollow resin particles have high compressive strength.

The number average particle diameter of the hollow resin particles is generally from 0.1 μm to 20.0 μm.

The particle size distribution (the volume average particle diameter (Dv)/the number average particle diameter (Dn)) of the hollow resin particles is not particularly limited. For example, it may be from 1.00 to 2.50. It is more preferably from 1.01 to 1.80, still more preferably from 1.02 to 1.40, particularly preferably from 1.03 to 1.35, most preferably from 1.04 to 1.28. When the particle size distribution is 2.50 or less, particles which have low dispersion in compressive strength characteristics and heat resistance among the particles can be obtained. Further, when the particle size distribution is 2.50 or less, for example, a product having uniform thickness can be produced when producing a product such as a molded product.

The volume average particle diameter (Dv) and the number average particle diameter (Dn) of the hollow resin particles can be found by, for example, using a laser diffraction particle size distribution measuring apparatus, measuring the particle diameter of each hollow resin particle and calculating the number average and the volume average of them, the obtained values can be the number average particle diameter (Dn) and the volume average particle diameter (Dv) of the particles, respectively. The particle size distribution is found by dividing the volume average particle diameter by the number average particle diameter.

The shell of the hollow resin particles contains a resin.

The polymerizable monomer, which is a raw material for the resin, contains a crosslinkable monomer. As needed, it contains a non-crosslinkable monomer.

In the present disclosure, the non-crosslinkable monomer means a compound having only one polymerizable functional group. For example, at least one monomer selected from the group consisting of a monovinyl monomer and a hydrophilic monomer, can be used.

In the present disclosure, the monovinyl monomer means a compound having one polymerizable carbon-carbon double bond, and a compound other than the hydrophilic monomer described later. A resin containing a monovinyl monomer unit is generated by polymerization of a monovinyl monomer.

The compound having one polymerizable carbon-carbon double bond is the carbon-carbon double bond itself, or it is a compound having a group containing a carbon-carbon double bond, such as a compound containing a vinyl group, an acrylic group, a methacrylic group, an ethylene group and an allyl group, for example. Examples of the monovinyl monomer include an acrylic-based monovinyl monomer such as (meth)acrylate; an aromatic monovinyl monomer such as styrene, vinyltoluene and α-methylstyrene; and a mono-olefin monomer such as ethylene, propylene and butylene.

In the present disclosure, (meth)acrylate means acrylate or methacrylate. Examples of (meth)acrylate include methyl (meth)acrylate, ethyl (meth)acrylate, butyl (meth)acrylate, 2-ethylhexyl (meth)acrylate, lauryl (meth)acrylate, glycidyl (meth)acrylate and 2-hydroxyethyl (meth)acrylate. (Meth)acrylic acids and (meth)acrylates may be used alone or in combination of two or more kinds.

Among the (meth)acrylates described above, preferably, at least one selected from the group consisting of butyl acrylate and methyl methacrylate is used.

Thus, by using a monomer which is resistant to relatively high temperature conditions such as (meth)acrylate, the heat resistance of the obtained hollow resin particle can be enhanced as compared to, for example, the case where a monomer having a nitrile group is used.

In the present disclosure, the hydrophilic monomer means a monomer soluble in water, and more specifically means a monomer having a solubility in water of 1% by mass or more. Using a hydrophilic monomer for the polymerization to obtain the resin is preferable particularly in terms of less aggregation of the obtained hollow resin particles. The polymerizable functional group of the hydrophilic monomer may be a carbon-carbon double bond itself, or it may be a group containing a carbon-carbon double bond.

The resin contained in the hollow resin particle may contain, as a hydrophilic monomer unit, for example, a carboxyl group-containing monomer unit, a hydroxyl group-containing monomer unit, an amide group-containing monomer unit and a polyoxyethylene group-containing monomer unit. Among them, it is preferable that the resin contains a carboxyl group-containing monomer unit, since particles with high heat resistance can be obtained. Further, the case where the resin contains a hydroxyl group-containing unit is preferable in the effect by use of the hydrophilic monomer, that is, using a hydrophilic monomer for polymerization to obtain the resin is preferable particularly in the effect of less aggregation of the obtained hollow resin particles.

Examples of the carboxyl group-containing monomer include a (meth)acrylic acid monomer and a maleic acid monomer. In the present disclosure, (meth)acrylic acid means acrylic acid or methacrylic acid. Especially, in the case where (meth)acrylic acid and the above-mentioned (meth)acrylate are used in combination, a preferred mass ratio is (meth)acrylic acid:(meth)acrylate=100:0 to 30:70, and a more preferred mass ratio is (meth)acrylic acid:(meth)acrylate=100:0 to 35:65.

Examples of the hydroxyl group-containing monomer include a 2-hydroxyethyl acrylate monomer, a 2-hydroxyethyl methacrylate monomer, a 2-hydroxypropyl acrylate monomer, a 2-hydroxypropyl methacrylate monomer, and a 4-hydroxybutyl acrylate monomer.

Examples of the amide group-containing monomer include an acrylamide monomer and a dimethylacrylamide monomer.

Examples of the polyoxyethylene group-containing monomer include a methoxypolyethylene glycol acrylate monomer and a methoxypolyethylene glycol methacrylate monomer.

In the present disclosure, the crosslinkable monomer means a compound having two or more polymerizable functional groups. The mechanical characteristics of the obtained copolymer shell can be enhanced by using the crosslinkable monomer. Further, since the crosslinkable monomer has a plurality of polymerizable functional groups, the monovinyl monomer and the hydrophilic monomer and so on described above can be linked together, particularly the heat resistance of the obtained hollow resin particle can be enhanced. Examples of the polymerizable functional groups include a carbon-carbon double bond itself or a group containing a carbon-carbon double bond.

The crosslinkable monomer is not particularly limited, as long as it has two or more polymerizable functional groups. Examples of the crosslinkable monomer include: aromatic divinyl compounds such as divinyl benzene, divinyl naphthalene, diallyl phthalate and derivatives thereof; ester compounds such as allyl (meth)acrylate, ethylene glycol di(meth)acrylate and diethylene glycol di(meth)acrylate, in which two or more compounds having a carbon-carbon double bond are esterified to a compound having two or more hydroxyl groups or carboxyl groups; other divinyl compounds such as N,N-divinylaniline and divinyl ether. Among them, at least one of divinyl benzene and ethylene glycol di(meth)acrylate is preferred.

With respect to 100 parts by mass of the repeating units constituting the resin, the content ratio of the crosslinkable monomer unit may be from 30 parts by mass to 100 parts by mass. The lower limit is preferably 35 parts by mass or more, more preferably 40 parts by mass or more, and still more preferably 45 parts by mass or more. The upper limit is preferably 90 parts by mass or less, more preferably 85 parts by mass or less, and still more preferably 80 parts by mass or less. When the content of the crosslinkable monomer contained is from 30 parts by mass to 100 parts by mass, the obtained hollow resin particles are not likely to be dented, so that the void ratio of the hollow resin particle can be maintained at a high level.

Meanwhile, with respect to 100 parts by mass of the repeating units constituting the resin, the content ratio of the non-crosslinkable monomer unit may be 0 part by mass to 70 parts by mass. The lower limit is preferably 3 parts by mass or more, more preferably 10 parts by mass or more, still more preferably 15 parts by mass or more, and particularly preferably 20 parts by mass or more. The upper limit is preferably 65 parts by mass or less, more preferably 60 parts by mass or less, still more preferably 55 parts by mass or less, and particularly preferably 45 parts by mass or less.

The content ratio of the crosslinkable monomer unit or the non-crosslinkable monomer unit is determined, for example, by calculating the ratio of the crosslinkable monomer subjected to the polymerization reaction, from the charged amount of the crosslinkable monomer at the time of polymerization and the remained amount of the crosslinkable monomer at the end of the polymerization.

To control the physical properties of the particle, in addition to the crosslinkable monomer unit or the non-crosslinkable monomer unit, the resin constituting the hollow resin particles may contain a monomer unit derived from a monomer other than the crosslinkable monomer unit or the non-crosslinkable monomer unit in the main chain or side chain, or any functional group may be modified on the polymer chain. For example, the resin constituting the hollow resin particle may be urethane-acrylic resins from the viewpoint of excellent heat insulating properties, or may be epoxy-acrylic resins from the viewpoint of expectation of high compressive strength.

The shape of the hollow resin particle is not particularly limited, as long as a hollow portion is formed in the interior, and examples include a spherical shape, an ellipsoidal shape and an irregular shape. Among them, a spherical shape is preferable in terms of ease of production.

The interior of the hollow resin particles generally has one or two or more hollow portions. The interior of the hollow resin particles may be porous as long as a hollow portion can be found. The interior of the hollow resin particles preferably has 5 or less hollow portions, more preferably 3 or less hollow portions, still more preferably 2 or less hollow portions, particularly preferably one hollow portion in order to maintain good balance between a high void ratio of the hollow resin particle and compressive strength of the hollow resin particle.

The average circularity of the hollow resin particles may be from 0.950 to 0.995.

In the present disclosure, "circularity" is defined as a value obtained by dividing the perimeter of a circle having the same area as the projected area of a particle image, by the perimeter of the particle image. Also in the present disclosure, the "average circularity" is used as a simple method of quantitatively representing the shape of the hollow resin particles and is an indicator that shows the degree of the surface roughness of the hollow resin particles. The average circularity is 1 when the hollow resin particles are perfectly spherical, and it gets smaller as the surface shape of the hollow resin particles becomes more complex.

For the hollow resin particle of the present disclosure, the shell thickness may be from 0.01 µm to 1.0 µm, may be from 0.02 µm to 0.95 µm, and may be from 0.05 µm to 0.90 µm.

When the shell thickness is 0.01 µm or more, the hollow resin particles can keep such a higher compressive strength that allows the particles to maintain the shape thereof. When the shell thickness is 1.0 µm or less, the hollow portion with a larger volume can be ensured in the interior of the hollow resin particle.

The method for measuring the shell thickness of the hollow resin particle is as follows. First, 20 hollow resin particles are selected as measurement objects. SEM observation of the cross sections of the hollow resin particles is performed. Next, from the thus-obtained SEM images of the cross sections of the particles, the thicknesses of the shells of the 20 hollow resin particles are measured. The average of the thicknesses is determined as the shell thickness of the hollow resin particle.

An example of an image of the shape of the hollow resin particle is a bag that comprises a thin covering film and is swollen with gas, and a cross-sectional view of the bag is like a hollow resin particle 100 in FIG. 1 described later. In this example, one thin covering film is disposed on the outside, and the interior is filled with gas.

The shape of the hollow resin particle can be determined by performing SEM and TEM, for example. Further, the shape of the interior of the hollow resin particle can be determined by cutting the particle into round slices by a known method and then performing SEM and TEM, for example.

[Method for Producing Hollow Resin Particles]

The method for producing the hollow resin particles is not particularly limited, as long as the hollow resin particles that satisfy at least the above-mentioned void ratio, can be produced by the method. Hereinbelow, an embodiment of the method for producing the hollow resin particles is described, but the method for producing the hollow resin particles of the present disclosure is not limited to the following embodiment.

An embodiment of the method for producing the hollow resin particles includes:
  a step comprising preparing a mixture liquid comprising a non-crosslinkable monomer, a crosslinkable monomer, an oil-soluble polymerization initiator, a hydrocarbon solvent, a suspension stabilizer and an aqueous medium (mixture liquid preparation step);
  a step comprising carrying out a suspension treatment of the mixture liquid described above to prepare a suspension in which monomer droplets containing the hydrocarbon solvent are dispersed in the aqueous medium (suspension preparation step);
  a step comprising subjecting the suspension described above to polymerization reaction to prepare a precursor composition containing a hollow resin particle precursor including the hydrocarbon solvent (polymerization step);
  a step comprising performing solid-liquid separation of the precursor composition described above to obtain a hollow resin particle precursor (solid-liquid separation step); and
  a step comprising removing the hydrocarbon solvent included in the hollow resin particle precursor to obtain a hollow resin particle (solvent removal step).

In the present disclosure, the "hollow resin particle precursor" means a particle of which the hollow portion is filled with water or a mixture of water and gas, or filled with an aqueous medium or a mixture of an aqueous medium and gas. In the present disclosure, the "precursor composition" means a composition containing a hollow resin particle precursor.

The disclosed embodiment includes, as described above, (1) a mixture liquid preparation step, (2) a suspension preparation step, (3) a polymerization step, (4) a solid-liquid separation step, and (5) a solvent removal step. The steps of the disclosed embodiment are not limited to these five steps.

Figure 1:
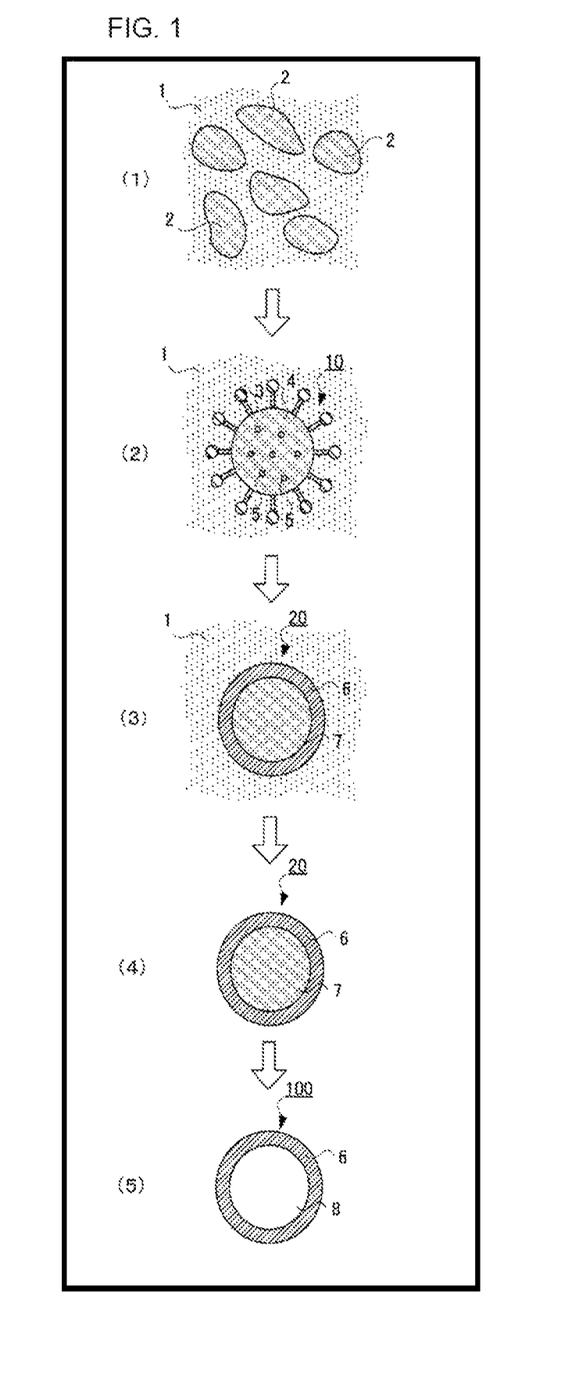
FIG. 1 is a schematic diagram showing an embodiment of a method for producing hollow resin particles used in the present disclosure.

FIG. 1 is a schematic diagram showing the disclosed embodiment. The diagrams (1) to (5) in FIG. 1 correspond to the steps (1) to (5) described above, respectively. The white arrow between the diagrams is one for indicating the order of the steps. FIG. 1 is only schematic diagrams for description, and the method for producing the hollow resin particles of the present disclosure is not limited to the method shown in FIG. 1. Further, the structures, dimensions, and shapes of materials used for the method for producing the hollow resin particles of the present disclosure is not limited to the structures, dimensions, or shapes of the various materials in FIG. 1.

The diagram (1) of FIG. 1 is a schematic diagram showing an embodiment of a mixture liquid in the mixture liquid preparation step. As shown in the diagram, the mixture liquid contains an aqueous medium 1 and a low polarity material 2 dispersed in the aqueous medium 1. Here, the low polarity material 2 means a material that has low polarity and is not likely to mix with the aqueous medium 1, such as a monovinyl monomer and a hydrocarbon solvent.

The diagram (2) of FIG. 1 is a schematic diagram showing an embodiment of a suspension in the suspension preparation step. The suspension contains the aqueous medium 1 and a micelle 10 (monomer droplets) dispersed in the aqueous medium 1. The micelle 10 is formed by surrounding the periphery of an oil-soluble monomer composition 4 (containing, for example, an oil-soluble polymerization initiator 5) with a surfactant 3.

The diagram (3) of FIG. 1 is a schematic diagram showing an embodiment of a precursor composition after the polymerization step. The precursor composition contains the aqueous medium 1 and a hollow resin particle precursor 20 dispersed in the aqueous medium 1. The hollow resin particle precursor 20 is formed by polymerization of a monovinyl monomer etc. in the micelle 10, and includes the hydrocarbon solvent 7 in the interior of the shell 6.

The diagram (4) of FIG. 1 is a schematic diagram showing an embodiment of a hollow resin particle precursor after the solid-liquid separation step. The diagram (4) shows a state where an aqueous medium 1 is separated from the state of the diagram (3).

The diagram (5) of FIG. 1 is a schematic diagram showing an embodiment of the hollow resin particle after the solvent removal step. The diagram (5) of FIG. 1 shows a state where a hydrocarbon solvent 7 is removed from the state of the diagram (4) of FIG. 1. As a result, a hollow resin particle 100 having a hollow portion 8 in the interior of the shell 6 is obtained.

Hereinbelow, the five steps mentioned above and other steps are described in order.

(1) Mixture Liquid Preparation Step

The present step is a step comprising preparing a mixture liquid containing (A) a non-crosslinkable monomer, (B) a crosslinkable monomer, (C) an oil-soluble polymerization initiator, (E) a hydrocarbon solvent, (F) a suspension stabilizer, and an aqueous medium.

Among them, (A) the non-crosslinkable monomer and (B) the crosslinkable monomer are as described above in [Hollow resin particle]. Other polymerizable monomers may be contained in the mixture liquid, in addition to (A) the non-crosslinkable monomer and (B) the crosslinkable monomer, which are described above in [Hollow resin particle].

(C) Oil-Soluble Polymerization Initiator

In the present disclosure, not an emulsion polymerization method using a water-soluble polymerization initiator but a suspension polymerization method using an oil-soluble polymerization initiator is employed. An advantage of employing the suspension polymerization method will be described in detail in "(2) Suspension preparation step".

The oil-soluble polymerization initiator is not particularly limited, as long as it is a lipophilic one having a solubility in water of 0.2% by mass or less. Examples of the oil-soluble polymerization initiator include benzoyl peroxide, lauroyl peroxide, t-butyl peroxide 2-ethylhexanoate, 2,2'-azobis(2,4-dimethylvaleronitrile), and azobis(isobutyronitrile).

With respect to 100 parts by mass of the total mass of (A) the non-crosslinkable monomer and (B) the crosslinkable monomer, the content of (C) the oil-soluble polymerization initiator is preferably from 0.1 part by mass to 10 parts by mass, more preferably from 0.5 part by mass to 7 parts by mass, and still more preferably from 1 part by mass to 5 parts by mass. When the content of (C) the oil-soluble polymerization initiator is 0.1 part by mass or more, the polymerization reaction is likely to progress sufficiently. When the content of (C) the oil-soluble polymerization initiator is 10 parts by mass or less, the oil-soluble polymerization initiator is not likely to be left after the end of polymerization reaction, so that an unexpected side reaction is not likely to progress.

(D) Hydrocarbon Solvent

The hydrocarbon solvent in the present disclosure has the function of forming a hollow portion in the interior of the particle.

In the suspension preparation step described later, a suspension in which monomer droplets containing a hydrocarbon solvent are dispersed in an aqueous medium is obtained. In the suspension preparation step, phase separation occurs in the monomer droplets; as a result, the hydrocarbon solvent with low polarity is likely to collect in the interior of the monomer droplets. In the end, in the monomer droplets, the hydrocarbon solvent is distributed in the interior and other materials than the hydrocarbon solvent are distributed at the periphery, in accordance with the respective polarities.

Then, in the polymerization step described later, a precursor composition containing a hollow resin particle precursor including the hydrocarbon solvent is obtained. That is, the hydrocarbon solvent is collected in the interior of the particle, so that a hollow portion made of the hydrocarbon solvent is formed in the interior of the obtained polymer particle (hollow resin particle precursor).

The type of the hydrocarbon solvent is not particularly limited. Examples of the hydrocarbon solvent include solvents with relatively high volatility, such as benzene, toluene, xylene, butane, pentane, hexane, heptane and cyclohexane.

The relative permittivity at 20° C. of the hydrocarbon solvent used in the present disclosure is preferably 3 or less. The relative permittivity is an index indicating the level of the polarity of the compound. In the case where the relative permittivity of the hydrocarbon solvent is 3 or less, which is sufficiently small, it is presumed that phase separation progresses rapidly in the monomer droplets and a hollow is easily formed.

Examples of solvents having a relative permittivity at 20° C. of 3 or less are as follows. The inside of the parentheses is the value of relative permittivity.

Heptane (1.9), cyclohexane (2.0), benzene (2.3) and toluene (2.4).

For the relative permittivity at 20° C., values written in known literatures (for example, the Chemical Society of Japan, as editor, "Kagaku Binran, Kiso Hen, Kaitei 4 Ban", pp. 11-498 to 11-503, published by Maruzen Publishing Co., Ltd. on Sep. 30, 1993) and other technical information may be used as reference. Examples of the method of measuring the relative permittivity at 20° C. include a relative permittivity test that is in conformity with 23 of JIS C 2101:1999 and is performed with the measuring temperature set to 20° C.

The hydrocarbon solvent used in the present disclosure may be a hydrocarbon compound having 5 to 7 carbon atoms. A hydrocarbon compound having 5 to 7 carbon atoms is easily included into a hollow resin particle precursor during the polymerization step, and furthermore can be easily removed from the interior of the hollow resin particle precursor during the solvent removal step. The hydrocarbon solvent is preferably a hydrocarbon compound having 6 carbon atoms.

With respect to 100 parts by mass of the total mass of (A) the non-crosslinkable monomer and (B) the crosslinkable monomer, the content of (D) the hydrocarbon solvent is preferably from 70 parts by mass to 900 parts by mass, more preferably from 150 parts by mass to 700 parts by mass, and still more preferably from 200 parts by mass to 500 parts by mass. When the content of (D) the hydrocarbon solvent is 70 parts by mass or more, the void ratio of the obtained hollow resin particle is large. When the content of (D) the hydrocarbon solvent is 900 parts by mass or less, the obtained hollow resin particle is likely to be excellent in mechanical characteristics, and not likely to cause a failure of maintaining the hollow.

(E) Suspension Stabilizer

The suspension stabilizer is an agent that stabilizes a suspension state in a suspension in a suspension polymerization method described later.

The suspension stabilizer may contain at least any one of a surfactant and a material other than the surfactant. The surfactant is a material that forms a micelle including a non-crosslinkable monomer, a crosslinkable monomer, an oil-soluble polymerization initiator, an oil-soluble polymerization initiator and a hydrocarbon solvent, in the suspension polymerization method described later.

As the surfactant, any of cationic surfactants, anionic surfactants, and nonionic surfactants may be used, and they may be used in combination. Among them, at least any one of anionic surfactants and nonionic surfactants is preferable, and anionic surfactants are more preferable.

Examples of the anionic surfactant include sodium dodecylbenzen sulfonate, sodium lauryl sulfate, dialkyl sodium sulfosuccinate and formalin condensate salt of naphthalene sulfonate.

Examples of the nonionic surfactant include polyoxyethylene alkyl ether, polyoxyethylene alkyl ester and polyoxyethylene sorbitan alkyl ester.

Examples of the cationic surfactant include didecyl dimethyl ammonium chloride and stearyl trimethyl ammonium chloride.

Examples of the material other than the surfactant contained in the suspension stabilizer, include a hardly-soluble inorganic compound such as sulfate (e.g., barium sulfate and calcium sulfate), carbonate (e.g., barium carbonate, calcium carbonate and magnesium carbonate), phosphate (e.g., calcium phosphate), metal oxide (e.g., aluminum oxide and titanium oxide) and metal hydroxide (e.g., aluminum hydroxide, magnesium hydroxide and iron(II)hydroxide) and a water-soluble polymer such as polyvinyl alcohol, methyl cellulose and gelatin.

The material other than the surfactant is preferably a hardly-soluble inorganic compound, more preferably at least one of phosphate and metal hydroxide, and particularly preferably hardly water-soluble metal hydroxide colloid.

As the suspension stabilizer, one or more kinds of suspension stabilizers may be used.

With respect to 100 parts by mass of the total mass of (A) the non-crosslinkable monomer, (B) the crosslinkable monomer, (C) the oil-soluble polymerization initiator and (D) the hydrocarbon solvent, the content of (E) the suspension stabilizer is preferably from 0.1 part by mass to 5 parts by mass, more preferably from 0.2 part by mass to 2 parts by mass, and still more preferably from 0.3 part by mass to 1 part by mass. When the content of (E) the suspension stabilizer is 0.1 part by mass or more, micelles are easily formed in an aqueous medium. When the content of (E) the suspension stabilizer is 5 parts by mass or less, a reduction in productivity by increasing in blowing in the step of removing the hydrocarbon solvent is not likely to occur.

(F) Others

In the present disclosure, the aqueous medium means one of water, a hydrophilic solvent and a mixture of water and a hydrophilic solvent.

The hydrophilic solvent in the present disclosure is not particularly limited, as long as it is one that mixes with water sufficiently and does not develop phase separation. Examples of the hydrophilic solvent include alcohols such as methanol and ethanol; tetrahydrofuran (THF); and dimethyl sulfoxide (DMSO).

Among the aqueous media, water is preferably used in terms of its high polarity. When a mixture of water and a hydrophilic solvent is used, it is important that the polarity of the entire mixture is not too low from the viewpoint of forming monomer droplets. For example, the mixing ratio (mass ratio) between water and the hydrophilic solvent may be set to water:hydrophilic solvent=99:1 to 50:50.

The mixture liquid prepared in the present step is a composition in a state where the materials (A) to (E) mentioned above and an aqueous media are simply mixed and, for example, stirred as appropriate. In the mixture liquid, oil phases containing the materials (A) to (D) mentioned above are dispersed in an aqueous medium, each with a size of a particle diameter of approximately several millimeters. The dispersion state of these materials in the mixture liquid can be observed with the naked eye, depending on the types of the materials.

In the present step, an oil phase which contains (A) the non-crosslinkable monomer, (B) the crosslinkable monomer, (C) the oil-soluble polymerization initiator and (D) the hydrocarbon solvent and in which the content of (B) the crosslinkable monomer is from 30 parts by mass to 100 parts by mass with respect to 100 parts by mass of the total mass of (A) the non-crosslinkable monomer and (B) the crosslinkable monomer, may be mixed with an aqueous phase containing (E) the suspension stabilizer and the aqueous medium to prepare a mixture liquid. Particles of which the compositions are uniform can be produced by thus mixing the oil phase and the aqueous phase.

(2) Suspension Preparation Step

The present step is a step comprising carrying out a suspension treatment of the mixture liquid described above to prepare a suspension in which monomer droplets containing the hydrocarbon solvent are dispersed in the aqueous medium.

In the suspension prepared in the present step, monomer droplets each containing the materials (A) to (D) mentioned above and having a volume average particle diameter of approximately from 1.0 μm to 20 μm are dispersed uniformly in the aqueous medium. Such monomer droplets are difficult to be observed with the naked eye, and can be observed with, for example, known observation equipment such as an optical microscope.

As described above, not an emulsion polymerization method but a suspension polymerization method is employed in the present disclosure. Hereinbelow, an advantage of using a suspension polymerization method and an oil-soluble polymerization initiator is described with contrast to an emulsion polymerization method.

Figure 2:
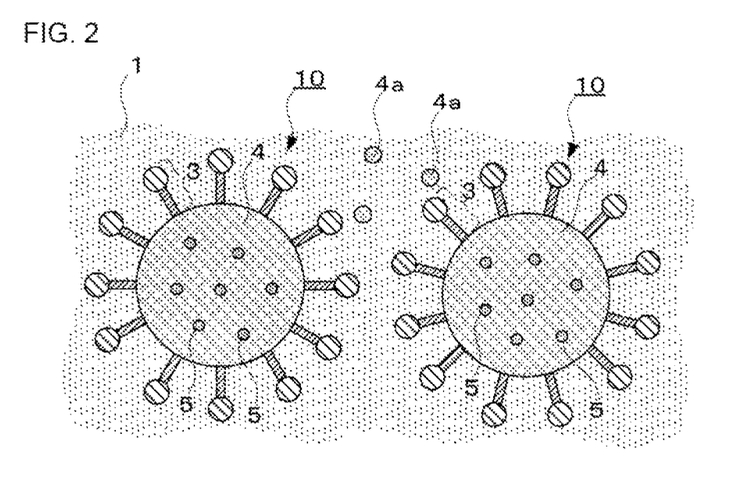
FIG. 2 is a schematic diagram showing an embodiment of a suspension in a suspension preparation step.

FIG. 2 is a schematic diagram showing an embodiment of a suspension in the suspension preparation step. A micelle 10 in FIG. 2 schematically shows a cross section thereof. FIG. 2 is only a schematic diagram, and the suspension in the present disclosure is not necessarily limited to that shown in FIG. 2. A part of FIG. 2 corresponds to the diagram (2) of FIG. 1 described above.

FIG. 2 shows a situation where micelles 10 and pieces of monomers 4a (including the monovinyl monomer and the crosslinkable monomer) that are dispersed in an aqueous medium, are dispersed in an aqueous medium 1. The micelle 10 is formed by a surfactant 3 surrounding the periphery of an oil-soluble monomer composition 4. The monomer composition 4 contains an oil-soluble polymerization initiator 5, monomers (including a monovinyl monomer and a crosslinkable monomer) and a hydrocarbon solvent (none of them is illustrated).

As shown in FIG. 2, in the suspension preparation step, a minute oil droplet that is a micelle 10 which contains the monomer composition 4 in the interior is formed in advance, and then polymerization initiating radicals are generated in the minute oil droplet from the oil-soluble polymerization initiator 5. Therefore, a hollow resin particle precursor with a target particle diameter can be produced without excessively growing the minute oil droplet.

Figure 3:
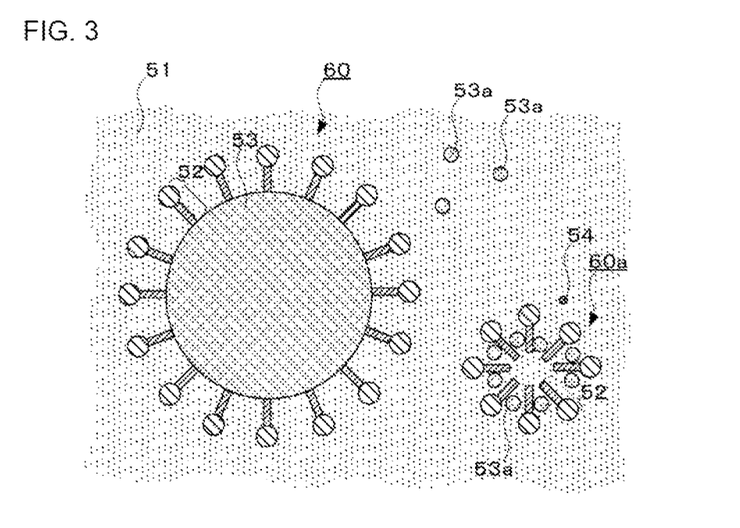
FIG. 3 is a schematic diagram showing a dispersion for conventional emulsion polymerization.

FIG. 3 is a schematic diagram showing a dispersion for emulsion polymerization. A micelle 60 in FIG. 3 schematically shows a cross section thereof.

FIG. 3 shows a situation where micelles 60, pieces of a micelle precursor 60a, pieces of a monomer 53a dissolved out in a solvent, and pieces of a water-soluble polymerization initiator 54 are dispersed in an aqueous medium 51. The micelle 60 is formed by a surfactant 52 surrounding the periphery of an oil-soluble monomer composition 53. The monomer composition 53 contains, for example, a monomer serving as a source material of a polymer, but does not contain a polymerization initiator.

On the other hand, the micelle precursor 60a is an aggregate of pieces of the surfactant 52, but does not contain a sufficient amount of the monomer composition 53 in the interior. The micelle precursor 60a, for example, incorporates pieces of the monomer 53a dissolved out in the solvent into the interior of the micelle precursor, and procures a part of the monomer composition 53 from other micelles 60; thereby, grows into the micelle 60.

The water-soluble polymerization initiator 54 enters the interiors of the micelle 60 and the micelle precursor 60a, and promotes the growth of oil droplets in the interiors of them while being diffused in the aqueous medium 51. Therefore, in the emulsion polymerization method, although each micelle 60 is monodispersed in the aqueous medium 51, it is predicted that the particle diameter of the micelle 60 will grow up to several hundred nm.

Further, as can be seen by comparing suspension polymerization (FIG. 2) and emulsion polymerization (FIG. 3), suspension polymerization (FIG. 2) does not provide an opportunity for the oil-soluble polymerization initiator 5 to come into contact with the monomer 4a dispersed in the aqueous medium 1. Thus, the generation of surplus polymer particles in addition to target hollow resin particles can be prevented by using an oil-soluble polymerization initiator.

A typical example of the suspension preparation step is shown below.

A mixture liquid containing the materials (A) to (E) mentioned above is subjected to the suspension treatment to form monomer droplets. The method of forming monomer droplets is not particularly limited; for example, the formation is performed using an apparatus capable of performing strong stirring, such as an (in-line type) emulsifying disperser (manufactured by Pacific Machinery & Engineering Co., Ltd.; product name: MILDER) or a high-speed emulsifying disperser (manufactured by PRIMIX Corporation; product name: T.K. HOMOMIXER MARK II Type).

As described above, in the present step, since phase separation occurs in the monomer droplet, the hydrocarbon solvent with low polarity is likely to collect in the interior of the monomer droplet. As a result, in the obtained monomer droplet, the hydrocarbon solvent is distributed in the interior, and other materials than the hydrocarbon solvent are distributed at the periphery.

A modified example of the suspension preparation step is shown below.

First, an oil phase containing the materials (A) to (D) mentioned above and an aqueous phase containing the material (E) and an aqueous medium are prepared, respectively. The oil phase is prepared preferably as the content of (B) the crosslinkable monomer is from 30 parts by mass to 100 parts by mass, with respect to 100 parts by mass of the total mass of (A) the non-crosslinkable monomer and (B) the crosslinkable monomer.

Next, a suspension is prepared by a membrane emulsification method. The membrane emulsification method is a method for obtaining, by extruding a dispersion phase solution into a continuous phase through the pores of a porous membrane, a suspension in which minute droplets of the dispersion phase are dispersed in the continuous phase. The dispersion phase means a liquid phase dispersed in the form of minute droplets, and the continuous phase means a liquid phase surrounding the periphery of the dispersion phase droplets. In the present disclosure, both a direct membrane emulsification method and a membrane emulsification method involving preliminary emulsification, etc., may be employed, as long as they are membrane emulsification methods in which the oil phase is made into the dispersion phase and the aqueous phase is made into the continuous phase.

In the membrane emulsification method, a membrane emulsification system (such as MN-20 manufactured by SPG Technology Co., Ltd.) and a membrane having a specific pore diameter are used. As the porous membrane usable in the membrane emulsification method, examples include, but are not limited to, an inorganic porous membrane such as a shirasu porous glass membrane (an SPG membrane) and an organic porous membrane such as a PTFE membrane.

The pore diameter of the porous membrane used in the membrane emulsification method defines the diameter of the obtained minute droplets. Depending on the components in the dispersion phase, since the diameter of the minute droplets has an influence on the number average particle diameter of the obtained hollow resin particles, the selection of the pore diameter of the porous membrane is important. For example, in the case of using a shirasu porous glass membrane (an SPG membrane), the pore diameter of the membrane is preferably selected from 0.1 μm to 5.0 μm.

In the suspension preparation step using such a membrane emulsification method, the suspension is prepared by performing the membrane emulsification in which the oil phase and the aqueous phase are made into the dispersion phase and the continuous phase, respectively, using the above-mentioned membrane emulsification system and the above-mentioned porous membrane.

The suspension preparation step of the present embodiment is not limited to the typical example and the modified example mentioned above.

(3) Polymerization Step

The present step is a step comprising subjecting the suspension described above to polymerization reaction to prepare a precursor composition containing a hollow resin particle precursor including the hydrocarbon solvent. Here, a hollow resin particle precursor is a particle formed mainly by copolymerization of the at least one non-crosslinkable monomer selected from the group consisting of the monovinyl monomer and the hydrophilic monomer, and the crosslinkable monomer described above.

The polymerization system is not particularly limited; for example, a batch system, a semicontinuous system and a continuous system may be employed. The polymerization temperature is preferably from 40° C. to 80° C., and more preferably from 50° C. to 70° C. The polymerization reaction time is preferably from 1 hour to 20 hours, and more preferably from 2 hours to 15 hours.

Since a monomer droplet including the hydrocarbon solvent in the interior is used, as described above, the hollow consisting of the hydrocarbon solvent is formed in the interior of the hollow resin particle precursor.

(4) Solid-Liquid Separation Step

The present step is a step comprising performing solid-liquid separation of the precursor composition described above to obtain a hollow resin particle precursor.

In the case where a hydrocarbon solvent included in a hollow resin particle precursor is removed in a slurry containing an aqueous medium, there is a problem that the obtained hollow resin particle collapses unless the same volume of water as the hydrocarbon solvent released from the interior of the hollow resin particle precursor, enters the interior of the particle.

A possible method to prevent the problem is a method in which the pH of the slurry is set to 7 or more to alkali-swell the shell of the particle, and then the hydrocarbon solvent is removed. In this case, since the shell of the particle acquires flexibility, replacement of the hydrocarbon solvent in the interior of the particle with water progresses rapidly, and a particle including water is obtained.

The method of performing solid-liquid separation of the precursor composition is not particularly limited, as long as it is a method that separates the solid components containing the hollow resin particle precursor and the liquid components containing the aqueous medium without removing the hydrocarbon solvent included in the hollow resin particle precursor, and known methods may be used. Examples of the method of solid-liquid separation include a centrifugation method, a filtration method, and still-standing separation; among them, a centrifugation method or a filtration method may be employed, and from the viewpoint of simplicity of the operation, a centrifugation method may be employed.

An optional step such as a preliminary drying step may be performed at a time after the solid-liquid separation step and before performing the solvent removal step described later. Examples of the preliminary drying step include a step comprising performing preliminary drying on the solid components obtained after the solid-liquid separation step, with a drying apparatus such as a dryer and a drying appliance such as a hand dryer.

(5) Solvent Removal Step

The present step is a step comprising removing the hydrocarbon solvent included in the hollow resin particle precursor to obtain a hollow resin particle.

The hydrocarbon solvent included in the hollow resin particle precursor may be removed in a gaseous atmosphere, or it may be removed in liquid.

In a strict sense, the term "in a gaseous atmosphere" in the present step means "in an environment where no liquid components exist in the outside of the hollow resin particle precursor", and it means "in an environment where only a very small amount of liquid components at a level that does not influence the removal of the hydrocarbon solvent exist in the outside of the hollow resin particle precursor". The term "in a gaseous atmosphere" can be reworded as a state where the hollow resin particle precursor does not exist in a slurry, or can be reworded as a state where the hollow resin particle precursor exists in a dry powder.

The method of removing the hydrocarbon solvent in the hollow resin particle precursor is not particularly limited, and known methods may be employed. Examples of the method include the reduced pressure drying method, the heat drying method, and the flash drying method, and use of these methods in combination.

In particular, in the case where the heat drying method is used, the heating temperature needs to be set to more than or equal to the boiling point of the hydrocarbon solvent and less than or equal to the highest temperature at which the shell structure of the hollow resin particle does not collapse. Therefore, depending on the composition of the shell of the hollow resin particle precursor and the type of the hydrocarbon solvent, for example, the heating temperature may be from 50° C. to 250° C., may be from 100° C. to 240° C., and may be from 150° C. to 220° C. The heating time may be from 1 hour to 24 hours, preferably from 2 hours to 15 hours, and more preferably from 3 hours to 10 hours.

The hydrocarbon solvent in the interior of the hollow resin particle precursor is replaced with gas in the outside by drying operation in a gaseous atmosphere; as a result, a hollow resin particle in which the gas occupies the hollow portion is obtained.

The drying atmosphere is not particularly limited. Examples of the drying atmosphere include air, oxygen, nitrogen, argon and vacuum. Further, by filling the interior of the hollow resin particle with gas once and then performing reduced pressure drying, a hollow resin particle of which the interior is evacuated is also obtained.

(6) Others

A possible example of a step other than the steps (1) to (5) mentioned above, is a step in which the gas in the interior of the hollow resin particle is replaced with another gas or liquid. By such replacement, the environment of the interior of the hollow resin particle can be changed, molecules can be selectively confined in the interior of the hollow resin particle, or the chemical structure of the interior of the hollow resin particle can be modified in accordance with the intended application thereof.

[Resin Composition Production Method]

As the method for producing the resin composition of the present disclosure, a method that is generally used for resin composition production, may be employed. The resin composition can be produced by uniformly integrating the components with, for example, a melt-kneader such as a single screw extruder, a twin screw extruder, a banbury mixer, a heating roller and various kinds of kneaders.

By using the resin composition of the present disclosure, the molded product having the specific void ratio can be stably obtained through a molding process that is carried out in a heat-pressing condition, without causing the hollow resin particles in the resin composition to collapse. Accordingly, the resin composition of the present disclosure can be suitably used in a molding method that is carried out in a heat-pressing condition, such as injection molding and compression molding.

From the resin composition of the present disclosure, a lightweight molded product can be obtained by any other known molding method such as extrusion molding, blow molding, calendering, inflation molding, blow molding, stretch molding and solution casting.

By the above-mentioned molding method, the resin composition of the present disclosure can be formed into a molded product in any shape, such as various kinds of three-dimensional shapes, a sheet shape, a film shape and a tube shape.

The resin composition of the present disclosure can be used as a raw material for various kinds of industrial products, industrial parts, etc.

More specifically, the resin composition of the present disclosure can be used as a raw material for the following: automobile interior parts such as an instrument panel, a center panel, a center console box and a steering wheel; home appliance parts such as a remote control switch, various kinds of keycaps of office automation appliances, a TV set, a stereo, a refrigerator and a vacuum cleaner; footwears such as sports shoes and fashion sandals; and parts of stationery supplies, tools and bicycle handlebars.

As the applications of the molded product of the present disclosure, examples include, but are not limited to, parts used in various kinds of fields such as the automotive field, the electrical and electronic field, the architecture field and the aerospace field; food containers; light reflective materials; heat insulation materials; sound insulation materials; and low dielectric materials.

EXAMPLES

Hereinafter, unless otherwise noted, "part" means "part by mass".

1. Production of Hollow Resin Particles

Production Example 1

(1) Mixture Liquid Preparation Step

First, materials (a1) to (d1) mentioned below were mixed to obtain a mixture (an oil phase).
- (a1) Methacrylic acid: 40 parts
- (b1) Ethylene glycol dimethacrylate: 60 parts
- (c1) 2,2'-Azobis(2,4-dimethylvaleronitrile) (an oil-soluble polymerization initiator, manufactured by Wako Pure Chemical Industries, Ltd., product name: V-65): 3 parts
- (d1) Cyclohexane: 150 parts Next, 4.0 parts of (e) a surfactant was added to 800 parts of ion-exchanged water to obtain a mixture (an aqueous phase).

The aqueous phase and the oil phase were mixed, and thus a mixture liquid was prepared.

(2) Suspension Preparation Step

The mixture liquid mentioned above was stirred with an in-line type emulsifying disperser to be suspended, and a suspension in which monomer droplets including cyclohexane were dispersed in water was prepared.

(3) Polymerization Step

The suspension mentioned above was stirred in a nitrogen atmosphere at 65° C. for 4 hours, and polymerization reaction was performed. By this polymerization reaction, a precursor composition containing a hollow resin particle precursor including cyclohexane was prepared.

(4) Solid-Liquid Separation Step

The obtained precursor composition was filtered to obtain solid components. The obtained solid components were dried with a dryer at a temperature of 40° C., and a hollow resin particle precursor including cyclohexane was obtained.

(5) Solvent Removal Step

The hollow resin particle precursor was subjected to heating treatment with a vacuum dryer at 200° C. for 6 hours in a vacuum condition, and thereby particles of Production Example 1 were obtained. From the scanning electron microscopy result and void ratio value of the particles, the obtained particles were confirmed to be hollow resin particles being in a spherical shape and having a hollow portion.

Production Examples 2 to 3

The particles of Production Examples 2 and 3 were obtained by a similar production method to Production Example 1, except that the materials and the addition amounts shown in Table 1 were employed in "(1) Mixture liquid preparation step" of Production Example 1. From the scanning electron microscopy result and void ratio value of the particles, the obtained particles of Production Examples 2 and 3 were confirmed to be hollow resin particles being in a spherical shape and having a hollow portion.

Production Example 4

The particles of Production Example 4 were obtained by a similar production method to Production Example 1, except the following: the materials and addition amounts shown in Table 1 were employed in "(1) Mixture liquid preparation step" of Production Example 1; the aqueous phase and the oil phase were supplied to the next "(2) Suspension preparation step" without mixing them; and in "(2) Suspension preparation step" of Production Example 1, a suspension was prepared by, instead of a suspension method using an in-line type emulsifying disperser, performing membrane emulsification in which the oil phase and the aqueous phase were made into the dispersion phase and the continuous phase, respectively, using a membrane emulsification system and a shirasu porous glass membrane having a pore diameter of 5 μm. From the scanning electron microscopy result and void ratio value of the particles, the obtained particles were confirmed to be hollow resin particles being in a spherical shape and having a hollow portion.

Production Examples 5 to 6

The particles of Production Examples 5 and 6 were obtained by a similar production method to Production Example 1, except the following: the materials and addition amounts shown in Table 1 were employed in "(1) Mixture liquid preparation step" of Production Example 1. From the scanning electron microscopy result and void ratio value of the particles, the obtained particles of Production Examples 5 and 6 were confirmed to be hollow resin particles being in a spherical shape and having a hollow portion.

Production Example 7

The particles of Production Example 7 were obtained by a similar production method to Production Example 1, except the following: the materials and addition amounts shown in Table 1 were employed in "(1) Mixture liquid preparation step" of Production Example 1; the aqueous phase and the oil phase were supplied to the next "(2) Suspension preparation step" without mixing them; and in "(2) Suspension preparation step" of Production Example 1, a suspension was prepared by, instead of a suspension method using an in-line type emulsifying disperser, performing membrane emulsification in which the oil phase and the aqueous phase were made into the dispersion phase and the continuous phase, respectively, using a membrane emulsification system and a shirasu porous glass membrane having a pore diameter of 10 μm. From the scanning electron microscopy result and void ratio value of the particles, the obtained particles were confirmed to be hollow resin particles being in a spherical shape and having a hollow portion.

Production Example 8

First, materials (a2), (α1), (α2), (c2) and (d2) mentioned below were mixed to obtain a mixture (an oil phase).
- (a2) Methyl methacrylate: 10 parts
- (α1) Acrylonitrile: 60 parts
- (α2) Methacrylonitrile: 30 parts
- (c2) Azobis(isobutyronitrile): 5 parts
- (d2) Isopentane: 30 parts Next, 200 parts of (y) a colloidal silica dispersion (the average particle diameter: 5 nm; the effective concentration of colloidal silica: 20% by mass) was added to 600 parts of ion-exchanged water to obtain a mixture (an aqueous phase).

The aqueous phase and the oil phase were mixed, and thus a mixture liquid was prepared.

The mixture liquid mentioned above was stirred with a disperser and suspended to obtain a suspension. The obtained suspension was stirred at a temperature condition of 60° C. for 10 hours, and a polymerization reaction was performed.

The suspension after the polymerization reaction was filtered to obtain solid components. The obtained solid components were dried with a dryer at 40° C. to obtain thermally expandable microcapsules.

Then, 100 parts of the obtained thermally expandable microcapsules were subjected to heating treatment with a dryer at 180° C. for 3 minutes in a gaseous atmosphere, and thereby hollow resin particles of Production Example 8 were obtained. From the scanning electron microscopy result and void ratio value of the particles, the obtained particles were confirmed to be hollow resin particles being in a spherical shape and having a hollow portion.

Production Example 9

The particles of Production Example 9 were obtained by a similar production method to Production Example 1, except that the materials and the addition amounts shown in Table 1 were employed in "(1) Mixture liquid preparation step" of Production Example 1. From the scanning electron microscopy result and void ratio value of the particles, the obtained particles were confirmed to be hollow resin particles being in a spherical shape and having a hollow portion.

2. Measurement and Evaluation of Particles

The following measurement and evaluation were performed on the hollow resin particles of Production Examples 1 to 9 (hereinafter, the hollow resin particles may be simply referred to as "particles"). Details are as follows.

(1) Measurement of Volume Average Particle Diameter of Particles

The particle diameter of each particle was measured using a laser diffraction particle size distribution measuring instrument (product name: SALD-2000, manufactured by: Shimadzu Corporation). The volume average of them were calculated, and the obtained value was taken as the volume average particle diameter of the particles.

(2) Measurement of Density of Particle and Calculation of Void Ratio

A. Measurement of Apparent Density of Particle

First, approximately 30 cm³ of the particles were introduced into a measuring flask with a volume of 100 cm³, and the mass of the introduced particles was precisely weighed. Next, the measuring flask in which the particles were introduced was precisely filled with isopropanol up to the marked line while care was taken so that air bubbles did not get in. The mass of the isopropanol added to the measuring flask was precisely weighed, and the apparent density $D_1$ (g/cm³) of the particle was calculated on the basis of Formula (I) mentioned below.

Apparent density $D_1$=[Mass of the hollow resin particles]/(100−

[Mass of the isopropanol]/[Specific gravity of the isopropanol at the measuring temperature])  Formula (I)

B. Measurement of True Density of Particle

The particles were pulverized in advance; then, approximately 10 g of pulverized pieces of the particles were introduced into a measuring flask with a volume of 100 cm³, and the mass of the introduced pulverized pieces was precisely weighed.

After that, similarly to the measurement of the apparent density mentioned above, isopropanol was added to the measuring flask, the mass of the isopropanol was precisely weighed, and the true density $D_0$ (g/cm³) of the particle was calculated on the basis of Formula (II) mentioned below.

True density $D_0$=[Mass of the pulverized pieces of the hollow resin particles]/(100−[Mass of the isopropanol]/[Specific gravity of the isopropanol at the measuring temperature])  Formula (II)

C. Calculation of Void Ratio

On the basis of the following formula (0), the apparent density $D_1$ was divided by the true density $D_0$; the resultant was multiplied by 100; and the value thus obtained was subtracted from 100, thereby calculating the void ratio of the particle.

Void ratio (%)=100−[Apparent density $D_1$]/[True density $D_0$]×100  Formula (0)

(3) Measurement of Glass Transition Temperature (Tg) of Particles

The glass transition temperature was measured on the basis of JIS K6911 using a differential scanning calorimeter (product name: DSC6220, manufactured by Seiko Instruments, Inc.) For the particles for which glass transition was not observed in a temperature range of from 0° C. to 250° C., the glass transition temperature of the particles was considered to be more than 250° C. and was not mentioned in Table 1. That is, it was revealed that the particles of Production Examples 1 to 7 and 9 do not cause glass transition in a temperature range of from 0° C. to 250° C., and the glass transition temperature of the particles is more than 250° C.

TABLE 1

|  |  | Production Example 1 | Production Example 2 | Production Example 3 | Production Example 4 | Production Example 5 | Production Example 6 | Production Example 7 | Production Example 8 | Production Example 9 |
| --- | --- | --- | --- | --- | --- | --- | --- | --- | --- | --- |
| Non-crosskinkable monomer | Methacrylic acid (parts) | 40 | 15 | 30 | 15 | 35 | 15 | 20 | — | — |
|  | Methyl methacrylate (parts) | — | 25 | 20 | — | — | 55 | 45 | 10 | — |
|  | Butyl acrylate (parts) | — | 20 | — | — | — | 15 | 10 | — | — |
|  | Acrylonitrile (parts) | — | — | — | — | — | — | — | 60 | — |
|  | Methacrylonitrile (parts) | — | — | — | — | — | — | — | 30 | — |
| Crosskinkable monomer | Ethylene glycol dimethacrylate (parts) | 60 | 40 | — | 85 | 65 | 15 | 25 | — | 100 |
|  | Divinyl benzene (parts) | — | — | 50 | — | — | — | — | — | — |
| Oil-soluble polymerization initiator (parts) |  | 3 | 3 | 3 | 3 | 3 | 3 | 3 | 5 | 3 |
| Hydrocarbon solvent | Cyclohexane (parts) | 150 | 80 | 100 | 300 | 600 | 45 | 80 | — | 187 |
|  | Isopentane (parts) | — | — | — | — | — | — | — | 30 | — |

TABLE 1-continued

| | | Production Example 1 | Production Example 2 | Production Example 3 | Production Example 4 | Production Example 5 | Production Example 6 | Production Example 7 | Production Example 8 | Production Example 9 |
|---|---|---|---|---|---|---|---|---|---|---|
| Suspension stabilizer | Magnesium hydroxide colloid (parts) | — | — | — | — | — | — | — | — | 8 |
| | Surfactant (parts) | 4.0 | 3.0 | 1.0 | 3.0 | 2.7 | 0.8 | 3.0 | — | — |
| | Colloidal silica dispersion (parts) | — | — | — | — | — | — | — | 200 | — |
| Ion-exchanged water (parts) | | 800 | 800 | 800 | 800 | 800 | 800 | 800 | 600 | 1500 |
| Volume average particle diameter Dv (μm) | | 2.8 | 3.8 | 4.6 | 15.4 | 2.3 | 4.2 | 25.5 | 12.4 | 6.2 |
| Number average particle diameter Dn (μm) | | 2.6 | 3.4 | 3.5 | 12.8 | 2.1 | 3.5 | 20.1 | 10.5 | 5.2 |
| Particle size distribution Dv/Dn | | 1.08 | 1.12 | 1.31 | 1.20 | 1.10 | 1.20 | 1.27 | 1.18 | 1.19 |
| Apparent density $D_1$ (g/cm$^3$) | | 0.36 | 0.55 | 0.48 | 0.20 | 0.12 | 0.71 | 0.55 | 0.27 | 0.36 |
| True density $D_0$ (g/cm$^3$) | | 1.20 | 1.20 | 1.19 | 1.19 | 1.19 | 1.19 | 1.20 | 1.21 | 1.20 |
| Void ration (%) | | 70 | 55 | 60 | 83 | 90 | 40 | 55 | 78 | 70 |
| Tg (° C.) | | — | — | — | — | — | — | — | 124 | — |

2. Production of Resin Composition

Example 1

First, 80 parts of polyamide 6 (manufactured by Unitika Ltd.) as a thermoplastic plastomer and 20 parts of the hollow resin particles obtained in Production Example 1 were mixed by a blender. Next, the mixture was kneaded by a biaxial kneader (product name: TEM-35B, manufactured by Toshiba Machine Co., Ltd.) and extruded into a pellet, thereby obtaining the pellet of a resin composition (1).

The obtained pellet of the resin composition (1) was dried by heating at 80° C. for 6 hours and then molded with an injection molding device, thereby obtaining the molded product of Example 1, which was in a flat plate shape having a size of 65 mm×65 mm×thickness 3 mm.

The specific gravity of the molded product of Example 1, which was obtained by the underwater replacement method in conformity with JIS K 7112, was measured, and the weight reduction ratio and specific gravity increase ratio of the molded product of Example 1 were calculated.

In the present disclosure, the weight reduction ratio is the ratio of weight reduction when the mass of the molded product formed by use of the resin consisting of only the thermoplastic plastomer, is determined as the reference.

The weight reduction ratio was calculated by the following formula:

Weight reduction ratio (%)=

100×(1−Specific gravity of the molded product/Specific gravity of the thermoplastic plastomer)

In the present disclosure, when the specific gravity (i.e., the theoretical specific gravity of the molded product) is calculated from the specific gravities and mass ratios of the thermoplastic plastomer and hollow resin particles, which are raw materials, and is determined as the reference, the specific gravity increase ratio is the ratio of increase in the specific gravity of the molded product obtained by heat-pressing and molding the resin composition. The specific gravity increase ratio is an index of the collapse resistance of the hollow resin particles. That is, the fact that the specific gravity of the molded product is equal to the theoretical specific gravity of the molded product (the specific gravity increase ratio: 0%) indicates that the hollow resin particles do not collapse in the kneading and molding processes, and the hollow of the particles is maintained even after the processes are carried out on the particles.

The specific gravity increase ratio was calculated by the following formula:

Specific gravity increase ratio (%)=

100×(Specific gravity of the molded product/Theoretical specific gravity of the molded product−1)

On the basis of the following formula and from the mass ratios and specific gravities of the thermoplastic plastomer and hollow resin particles, the theoretical specific gravity of the molded product was obtained by adding the value obtained by multiplying the mass ratio (a) of the thermoplastic plastomer by the specific gravity of the thermoplastic plastomer and the value obtained by multiplying the mass ratio (1−a) of the hollow resin particles by the specific gravity of the hollow resin particles.

Theoretical specific gravity (g/cm$^3$) of the molded product=(a)×[Specific gravity (g/cm$^3$) of the thermoplastic plastomer]+(1−a)×[Specific gravity (g/cm$^3$) of the hollow resin particles]

Examples 2 to 4

The resin compositions and molded products of Examples 2 to 4 were obtained by a similar production method to Example 1, except that the materials and addition amounts shown in Table 2 were employed. The specific gravities of the molded products of Examples 2 to 4, which were obtained by the underwater replacement method in conformity with JIS K 7112, were measured, and the weight reduction ratios and specific gravity increase ratios of the molded products of Examples 2 to 4 were calculated.

Examples 5 to 6

The resin compositions and molded products of Examples 5 and 6 were obtained by a similar production method to Example 1, except that the materials and addition amounts shown in Table 2 were employed. The specific gravities of the molded products of Examples 5 and 6, which were obtained by the underwater replacement method in conformity with JIS K 7112, were measured, and the weight reduction ratios and specific gravity increase ratios of the molded products of Examples 5 and 6 were calculated. In Examples 5 to 6, polypropylene (manufactured by Prime Polymer Co., Ltd.) was used as the thermoplastic plastomer.

Example 7

The resin composition and molded product of Example 7 were obtained by a similar production method to Example 1, except that the materials and addition amounts shown in Table 2 were employed. The specific gravity of the molded product of Example 7, which was obtained by the water replacement method in conformity with JIS K 7112, was measured, and the weight reduction ratio and specific gravity increase ratio of the molded product of Example 7 were calculated.

Comparative Examples 1 to 3

The resin compositions and molded products of Comparative Examples 1 to 3 were obtained by a similar production method to Example 1, except that the materials and addition amounts shown in Table 2 were employed. The specific gravities of the molded products of Comparative Examples 1 to 3, which were obtained by the underwater replacement method in conformity with JIS K 7112, were measured, and the weight reduction ratios and specific gravity increase ratios of the molded products of Comparative Examples 1 to 3 were calculated.

Comparative Examples 4 to 5

The resin compositions and molded products of Comparative Examples 4 and 5 were obtained by a similar production method to Example 1, except that the materials and addition amounts shown in Table 2 were employed and similar kneading and molding conditions to Example 5 were employed. The specific gravities of the molded products of Comparative Examples 4 and 5, which were obtained by the underwater replacement method in conformity with JIS K 7112, were measured, and the weight reduction ratios and specific gravity increase ratios of the molded products of Comparative Examples 4 and 5 were calculated. The results are shown in Table 2. In Table 2, "PA6" means polyamide 6, and "PP" means polypropylene.

TABLE 2

| Resin composition | Thermoplastic plastomer | Hollow resin particles | Resin composition (parts) Thermoplastic plastomer | Hollow resin particles | Theoretical specific gravity of molded product (g/cm$^3$) | Specific gravity of molded product (g/cm$^3$) | Weight reduction ratio % | Specific gravity increase ratio % |
|---|---|---|---|---|---|---|---|---|
| Example 1 | PA6 | Production Example 1 | 80 | 20 | 0.791 | 0.796 | 30 | 1 |
| Example 2 | PA6 | Production Example 2 | 60 | 40 | 0.791 | 0.801 | 29 | 1 |
| Example 3 | PA6 | Production Example 3 | 70 | 30 | 0.804 | 0.825 | 27 | 3 |
| Example 4 | PA6 | Production Example 4 | 90 | 10 | 0.771 | 0.799 | 29 | 4 |
| Example 5 | PP | Production Example 1 | 80 | 20 | 0.692 | 0.711 | 21 | 3 |
| Example 6 | PP | Production Example 2 | 60 | 40 | 0.714 | 0.721 | 20 | 1 |
| Example 7 | PA6 | Production Example 9 | 80 | 20 | 0.791 | 0.794 | 30 | 0 |
| Comparative Example 1 | PA6 | Production Example 5 | 95 | 5 | 0.795 | 1.105 | 2 | 39 |
| Comparative Example 2 | PA6 | Production Example 6 | 50 | 50 | 0.872 | 1.044 | 8 | 20 |
| Comparative Example 3 | PA6 | Production Example 8 | 90 | 10 | 0.857 | 1.105 | 2 | 29 |
| Comparative Example 4 | PP | Production Example 7 | 90 | 10 | 0.750 | 0.870 | 3 | 16 |
| Comparative Example 5 | PP | Production Example 8 | 90 | 10 | 0.730 | 0.884 | 2 | 21 |

For Examples 1 to 7, the weight reduction ratio is 20% or more and high, and the specific gravity increase ratio is 4% or less. The results indicate that the hollow structure of the hollow resin particles was maintained.

For Comparative Example 1 using the hollow resin particles of Production Example 5, which are particles high in the void ratio, the weight reduction ratio is low, and the specific gravity increase ratio is high. Accordingly, it is indicated that the hollow resin particles collapsed during the particles were processed.

For Comparative Example 2 or 4 using the hollow resin particles of Production Example 6 or 7, which are particles less in the crosslinkable monomer, the weight reduction ratio is low, and the specific gravity increase ratio is high. Accordingly, it is indicated that the hollow resin particles collapsed during the particles were processed.

For Comparative Examples 3 and 5 using the hollow resin particles of Production Example 8, which are particles not containing a crosslinkable monomer, the weight reduction ratio is low, and the specific gravity increase ratio is high. Accordingly, it is indicated that the hollow resin particles collapsed during the particles were processed.

From the above results, it was proved that a lightweight molded product can be stably molded by the resin composition of the present disclosure.

REFERENCE SIGNS LIST

1. Aqueous medium
2. Low polarity material
3. Surfactant
4. Monomer composition
4a. Monomer dispersed in aqueous medium
5. Oil-soluble polymerization initiator
6. Shell
7. Hydrocarbon solvent
8. Hollow portion
10. Micelle
20. Hollow resin particle precursor
51. Aqueous medium
52. Surfactant
53. Monomer composition
53a. Monomer dissolved out to aqueous medium
54. Water-soluble polymerization initiator
60. Micelle
60a. Micelle precursor
100. Hollow resin particle

The invention claimed is:

1. A resin composition comprising 50 parts by mass to 95 parts by mass of a thermoplastic plastomer and 5 parts by mass to 50 parts by mass of hollow resin particles,
    wherein the hollow resin particles have a void ratio of from 50% to 85%;
    wherein the hollow resin particles have a shell containing a resin; and
    wherein, with respect to 100 parts by mass of repeating units constituting the resin, 30 parts by mass to 100 parts by mass of a crosslinkable monomer unit and 0 part by mass to 70 parts by mass of a non-crosslinkable monomer unit are contained as a polymerizable monomer unit; and
    wherein the hollow resin particles have a particle size distribution, that is, a volume average particle diameter thereof (Dv)/a number average particle diameter thereof (Dn), of from more than 1.20 and 2.50 or less.

2. The resin composition according to claim 1, wherein the hollow resin particles do not exhibit a glass transition temperature in a range of from 0° C. to 250° C.

3. The resin composition according to claim 1, wherein the hollow resin particles have a volume-based average particle diameter of from 1.0 μm to 20.0 μm.

4. A molded product comprising the resin composition defined by claim 1.

5. The resin composition according to claim 1, wherein a crosslinkable monomer constituting the crosslinkable monomer unit is at least one selected from the group consisting of divinyl benzene and ethylene glycol di(meth)acrylate.

6. The resin composition according to claim 1, wherein a crosslinkable monomer constituting the crosslinkable monomer unit is an aromatic divinyl compound.

7. The resin composition according to claim 1, wherein the hollow resin particles have a number average particle diameter of from 1.0 μm to 20.0 μm.

8. The resin composition according to claim 1, wherein the resin composition comprising more than 80 parts by mass and 95 parts by mass or less of the thermoplastic plastomer and 5 parts by mass or more and less than 20 parts by mass of hollow resin particles.

* * * * *